(12) United States Patent
Firoiu et al.

(10) Patent No.: US 7,397,762 B1
(45) Date of Patent: Jul. 8, 2008

(54) SYSTEM, DEVICE AND METHOD FOR SCHEDULING INFORMATION PROCESSING WITH LOAD-BALANCING

(75) Inventors: Victor Firoiu, Westford, MA (US); Mohnish Anumala, Littleton, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1077 days.

(21) Appl. No.: 10/261,007

(22) Filed: Sep. 30, 2002

(51) Int. Cl.
*H04L 1/00* (2006.01)
*H04L 12/26* (2006.01)

(52) U.S. Cl. .................. 370/230; 370/237; 370/412
(58) Field of Classification Search .................. None
See application file for complete search history.

(56) References Cited

U.S. PATENT DOCUMENTS

| | | | | |
|---|---|---|---|---|
| 6,067,298 A * | 5/2000 | Shinohara | .............. | 370/395.71 |
| 6,438,134 B1 * | 8/2002 | Chow et al. | .................. | 370/412 |
| 6,574,195 B2 * | 6/2003 | Roberts | ....................... | 370/235 |
| 6,778,495 B1 * | 8/2004 | Blair | ........................... | 370/230 |
| 6,961,539 B2 * | 11/2005 | Schweinhart et al. | ...... | 455/12.1 |
| 7,012,919 B1 * | 3/2006 | So et al. | ..................... | 370/392 |
| 7,206,861 B1 * | 4/2007 | Callon | ........................ | 709/242 |
| 2004/0143593 A1 * | 7/2004 | Le Maut et al. | ............. | 707/102 |

* cited by examiner

*Primary Examiner*—Ronald Abelson
(74) *Attorney, Agent, or Firm*—Anderson Gorecki + Manaras

(57) ABSTRACT

Packets are spread among a number of packet processors with load-balancing. The incoming packets are logically divided into a number of packet flows, where the number of packet flows is greater than the number of packet processors. Each packet flow is assigned to a particular packet processor. When a packet is received, the packet flow for the packet is determined, and the packet is queued for the packet processor associated with the flow based upon a predetermined queuing scheme. The mapping of packet flows to packet processors is not fixed, but rather is dynamically updated based upon the amount of data associated with each packet flow and each packet processor.

21 Claims, 11 Drawing Sheets

SYSTEM, DEVICE AND METHOD FOR SCHEDULING INFORMATION PROCESSING WITH LOAD-BALANCING

FIELD OF THE INVENTION

The present invention relates generally to communication systems, and more particularly to packet scheduling with load-balancing in a communication system.

BACKGROUND OF THE INVENTION

In a communication system, incoming packets are spread among a number of packet processors, for example, for address lookup and segmentation into cells. Each packet processor has a limited throughput data rate and a limited packet lookup rate. It is desirable for the incoming packets to be spread among the number of packet processors in such a way that the packet processing load is balanced among the number of packet processors. For example, it is desirable to avoid over-subscribing one packet processor while other packet processors are under-subscribed.

SUMMARY OF THE INVENTION

In accordance with one aspect of the invention, packets are spread among a number of packet processors with load-balancing. The incoming packets are logically divided into a number of packet flows, where the number of packet flows is greater than the number of packet processors. Each packet flow is assigned to a particular packet processor. When a packet is received, the packet flow for the packet is determined, and the packet is queued for the packet processor associated with the flow based upon a predetermined queuing scheme. The mapping of packet flows to packet processors is not fixed, but rather is dynamically updated based upon the amount of data associated with each packet flow and each packet processor.

DETAILED DESCRIPTION OF A PREFERRED EMBODIMENT

In an embodiment of the present invention, incoming packets are spread among a number of packet processors with load-balancing. Specifically, the incoming packets are logically divided into a number of packet flows, where the number of packet flows is greater than the number of packet processors. Each packet flow is assigned to a particular packet processor. When a packet is received, the packet flow for the packet is determined, and the packet is queued for the packet processor associated with the flow based upon a predetermined queuing scheme. The predetermined queuing scheme typically takes into account the priority of the packet (based upon quality of service or other criteria) and the amount of data already in the queue to drop lower priority packets as the queue size increases. The mapping of packet flows to packet processors is not fixed, but rather is dynamically updated based upon the amount of data associated with each packet flow and each packet processor.

Figure 1:
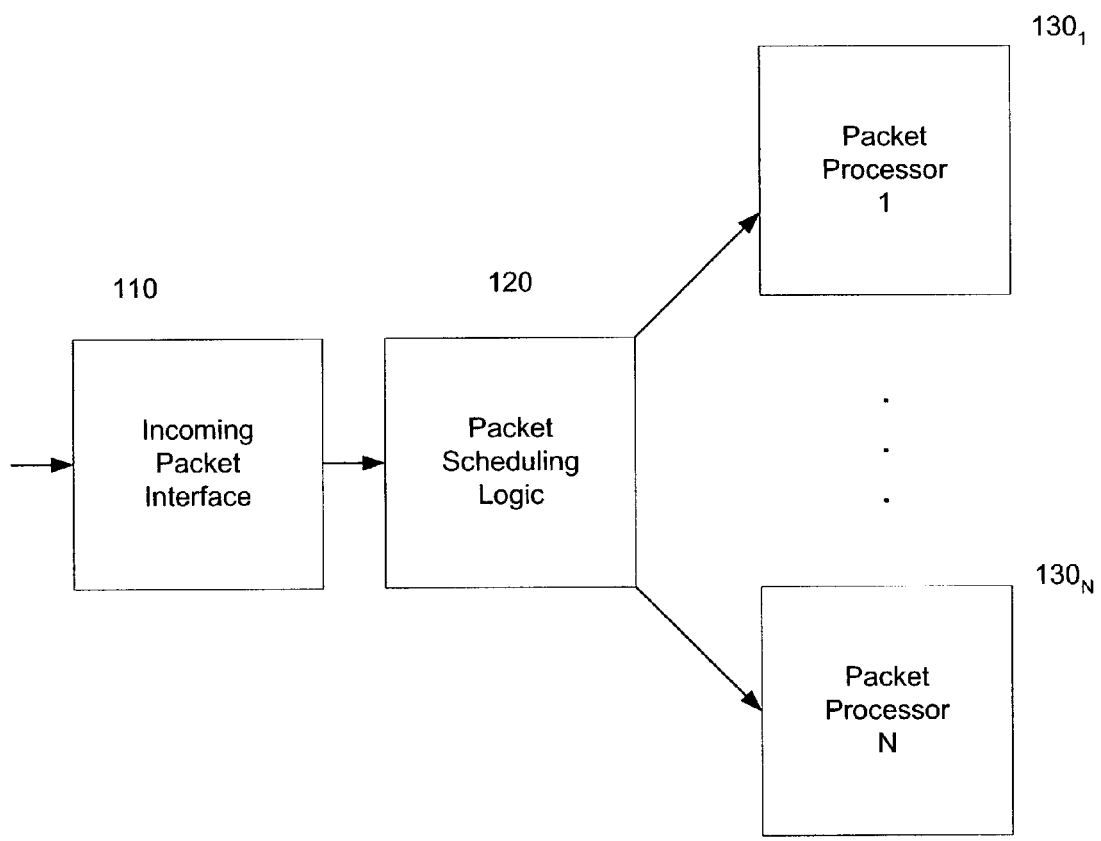
FIG. 1 shows the relevant components of an exemplary networking device in accordance with an embodiment of the present invention.

FIG. 1 shows the relevant components of an exemplary networking device 100 in accordance with an embodiment of the present invention. Among other things, the networking device 100 includes an incoming packet interface 110, packet scheduling logic 120, and a number of packet processors $130_1$-$130_N$. Packets received over the incoming packet interface 110 are spread among the packet processors $130_1$-$130_N$ by the packet scheduling logic 120.

Specifically, the packet scheduling logic 120 associates each packet with one of a number of packet flows. The number of packet flows is greater than the number of packet processors. The packet scheduling logic 120 assigns each packet flow to one of the packet processors. The packet scheduling logic 120 maintains statistics for each packet flow. The packet scheduling logic 120 dynamically updates the assignment of packet flows to packet processors based upon packet flow statistics according to a predetermined assignment scheme.

Figure 2:
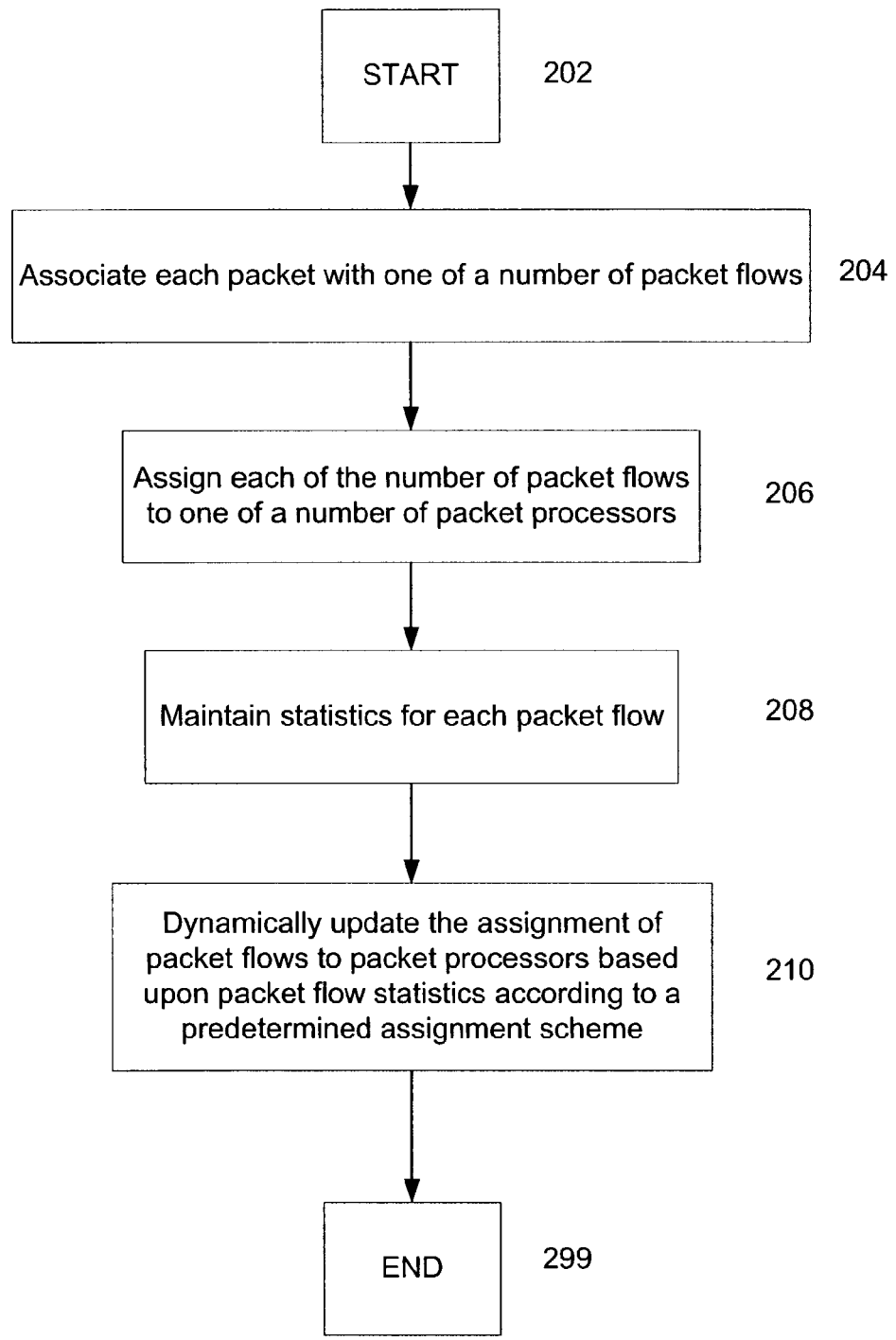
FIG. 2 is a logic flow diagram showing exemplary packet scheduling logic for assigning packet flows in accordance with an embodiment of the present invention.

FIG. 2 is a logic flow diagram showing exemplary packet scheduling logic 200 for assigning packet flows in accordance with an embodiment of the present invention. Beginning at block 202, the logic associates each packet with one of a number of packet flows, in block 204. The logic assigns each of the number of packet flows to one of a number of packet processors, in block 206. The logic maintains statistics for each packet flow, in block 208. The logic dynamically updates the assignment of packet flows to packet processors based upon packet flow statistics according to a predetermined assignment scheme, in block 210. The logic 200 terminates in block 299.

In a typical embodiment of the present invention, control packets are associated with a dedicated packet flow that is assigned to a dedicated packet processor. For convenience, the packet processor that is used for control packets is referred to hereinafter as the control packet processor. Control packets typically include OSPF, RIP, BPDU, ARP, IGMP, and other control packets.

When a packet is received, the packet scheduling logic 120 determines a packet type for the packet. If the packet is a control packet, then the packet scheduling logic 120 queues the packet for the control packet processor. If the packet is a non-control packet, then the packet scheduling logic 120 determines a packet flow for the packet and queues the packet for the packet processor associated with the packet flow based upon the predetermined queuing scheme. The predetermined queuing scheme typically takes into account the priority of the packet (based upon quality of service or other criteria) and the amount of data already in the queue to drop lower priority packets as the queue size increases. The packet scheduling logic 120 also updates statistics for the packet flow based upon the packet size.

Figure 3:
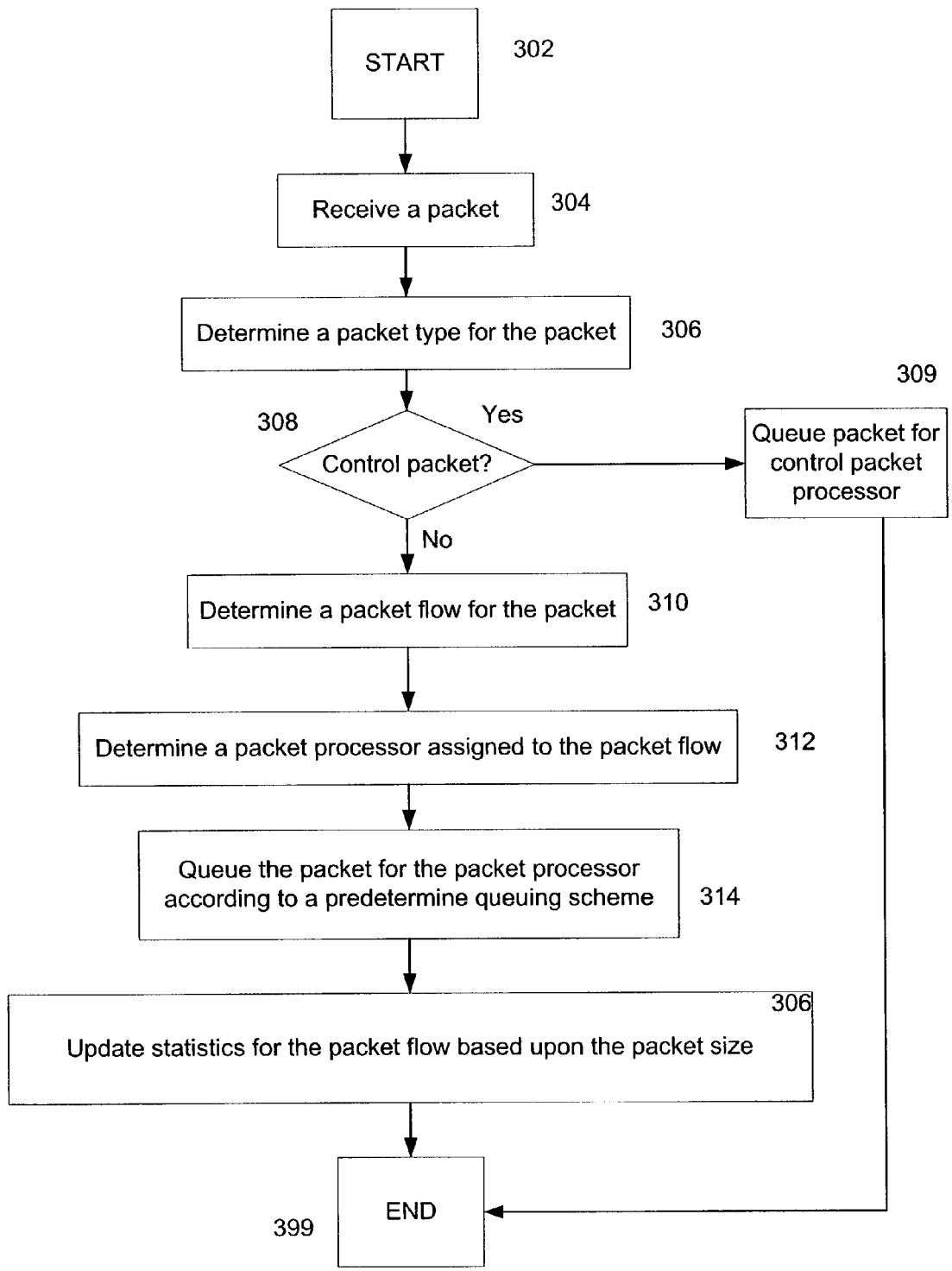
FIG. 3 is a logic flow diagram showing exemplary packet scheduling logic for scheduling a packet in accordance with an embodiment of the present invention.

FIG. 3 is a logic flow diagram showing exemplary packet scheduling logic 300 for scheduling a packet in accordance with an embodiment of the present invention. Beginning in block 302, and upon receiving a packet in block 304, the logic determines a packet type for the packet, in block 306. If the packet is a control packet (YES in block 308), then the logic queues the packet for the control packet processor, in block 309. If the packet is a non-control packet (NO in block 308), then the logic determines a packet flow for the packet, in block 310. The logic then determines a packet processor assigned to the packet flow, in block 312. The logic queues the packet for the packet processor according to a 20, predetermined queuing scheme, in block 314, and updates statistics for the packet flow based upon the packet size, in block 316. The logic 300 terminates in block 399.

In an exemplary embodiment of the present invention, there are M packet flows (M greater than N) for non-control packets. The packet scheduling logic 120 associates each non-control packet with one of the M packet flows.

In an exemplary embodiment of the present invention, the packet scheduling logic 120 maintains a flow table that includes M flow table entries, one for each of the M packet flows. Each flow table entry includes a packet processor identifier and a counter.

Figure 4:
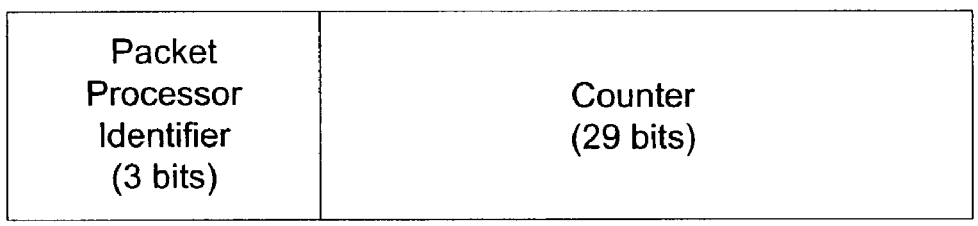
FIG. 4 shows an exemplary flow table entry in accordance with an embodiment of the present invention.

FIG. 4 shows an exemplary flow table entry 400 in accordance with an embodiment of the present invention. The flow table entry 400 is a 32-bit entity that includes a 3-bit packet processor identifier 410 and a 29-bit counter 420.

The packet scheduling logic 120 assigns each of the M packet flows to one of the (N−1) packet processors that are used for non-control packets. Typically, the M packet flows are initially distributed equally among the (N−1) packet processors such that a substantially equal number of packet flows is assigned to each of the (N−1) packet processors. The packet processor identifier in each flow table entry is initialized to an identifier associated with the corresponding assigned packet processor. This is typically a packet processor number from one to (N−1). The counter in each flow table entry is typically initialized to zero.

When a packet is received, the packet scheduling logic 120 determines a packet type for the packet. If the packet is a control packet, then the packet scheduling logic 120 queues the packet for the control packet processor. If the packet is a non-control packet, then the packet scheduling logic 120 determines a packet flow for the packet.

In an exemplary embodiment of the present invention, the packet scheduling logic 120 determines the packet flow for the packet based upon addressing information in the packet using a hashing function. Specifically, the packet scheduling logic 120 generates a flow number for the packet (M possible values) based upon source and destination MAC (layer 2) addresses and source and destination IP (layer 3) addresses in the packet using a hashing function.

After determining the packet flow for the packet, the packet scheduling logic 120 obtains from the flow table the flow table entry corresponding to the packet flow for the packet.

In an exemplary embodiment of the present invention, the packet scheduling logic 120 obtains the flow table entry by indexing into the flow table using the flow number generated based upon source and destination MAC (layer 2) addresses and source and destination IP (layer 3) addresses in the packet using the hashing function.

After obtaining the flow table entry from the flow table, the packet scheduling logic 120 obtains the packet processor identifier from the flow table entry. The packet scheduling logic 120 then queues the packet for the packet processor identified by the packet processor identifier according to a predetermined queuing scheme and updates statistics for the packet flow based upon the packet size.

In an exemplary embodiment of the present invention, the predetermined queuing scheme is a prioritized queuing scheme that takes into account a relative priority for the packet as well as the amount of data in the packet processor queue.

Specifically, the packet scheduling logic 120 determines a priority for the packet. In an exemplary embodiment of the present invention, the packet scheduling logic 120 maintains a quality-of-service (QoS) table that maps each packet to a corresponding packet priority (referred to hereinafter as the internal service class or ISC). Each entry in the quality-of-service table typically includes an offset value, a match value, and an ISC value.

Figure 5:
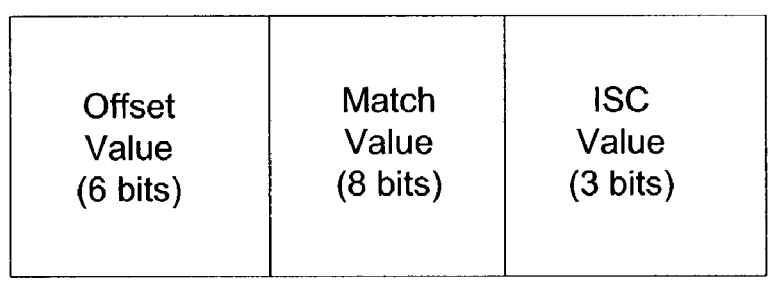
FIG. 5 shows an exemplary QoS table entry in accordance with an embodiment of the present invention.

FIG. 5 shows an exemplary QoS table entry 500. The QoS table entry 500 includes a 6-bit offset value 510, an 8-bit match value 520, and a 3-bit ISC value 530.

The packet scheduling logic 120 determines the priority for the packet using the quality-of-service table, specifically by using the offset value in successive QoS table entries as an index into the packet to access a byte of interest and assigning the packet the priority indicated by the ISC value of a QoS table entry if the byte in the packet is equal to the match value of the QoS table entry.

After determining a priority for the packet, the packet scheduling logic 120 determines whether the priority for the packet is within a set of acceptable priorities for the amount of data in the packet processor queue. If the priority for the packet is within the set of acceptable priorities for the amount of data in the packet processor queue, then the packet scheduling logic 120 queues the packet for the packet processor. If the priority for the packet is not within the set of acceptable priorities for the amount of data in the packet processor queue, then the packet scheduling logic 120 drops the packet without queuing the packet for the packet processor.

In an exemplary embodiment of the present invention, each packet processor queue is associated with a number of queue size thresholds. Each queue size threshold is associated with a set of acceptable priorities. The queue size thresholds typically operate such that, as the queue size increases, only successively higher priority packets get queued to the packet processor. Thus, for example, if the queue size is below a first threshold, all packets get queued; if the queue size is below a second threshold, only packets having priority less than or equal to five get queued; if the queue size is below a third threshold, only packets having priority less than or equal to three get queued; and if the queue size is above the third threshold, only packets having priority less than or equal to one get queued (where a priority of zero is the highest priority).

The packet scheduling logic 120 updates statistics for the packet flow based upon the packet size. In an exemplary embodiment of the present invention, the packet scheduling logic 120 increments the counter in the flow table entry in proportion to the packet size. Thus, the counter is a representation of the amount of data associated with the packet flow since the last time the counter was cleared.

The packet scheduling logic 120 periodically updates the assignment of packet flows to packet processors based upon packet flow statistics in order to balance the load of non-control packets among the (N−1) packet processors. Specifically, the packet scheduling logic 120 calculates the usage of each packet processor by adding together the counter from each flow table entry associated with a particular packet flow (i.e., each flow table entry having a particular packet processor identifier). The packet scheduling logic 120 selectively redistributes packet flows as necessary to balance the load among the packet processors. For example, the packet scheduling logic 120 might move a particular packet flow from one packet processor to another packet processor. The packet scheduling logic 120 does not necessarily maintain an equal number of packet flows per packet processor. For any packet flows that are moved to a different packet processor, the packet scheduling logic 120 updates the packet processor identifier in the corresponding flow table entry to reflect the new packet processor for the packet flow. After updating the assignment of packet flows to packet processors, the packet scheduling logic 120 typically clears the counter in all flow table entries.

It should be noted that the scheme used for updating the counters based upon the packet sizes should ensure that the counters do not wrap back to zero before the packet scheduling logic 120 periodically updates the assignment of packet flows to packet processors. This can be done, for example, by incrementing the counter by the number of double-words in the packet rather than by the number of bytes in the packet or by increasing the frequency with which the packet scheduling logic 120 updates the assignment of packet flows to packet processors.

It should also be noted that the aggregation of all counters associated with a particular packet processor does not necessarily reflect all data that was actually processed by the packet processor, since the prioritized queuing scheme drops certain packets as the queue size increases. Rather, the aggregation of all counters associated with a particular packet flow represents the amount of data intended for the packet processor based upon a particular mapping of packet flows to packet processors. The packet scheduling logic 120 adjusts the mapping of packet flows to packet processors in order to balance the load among the packet processors.

Figure 6:
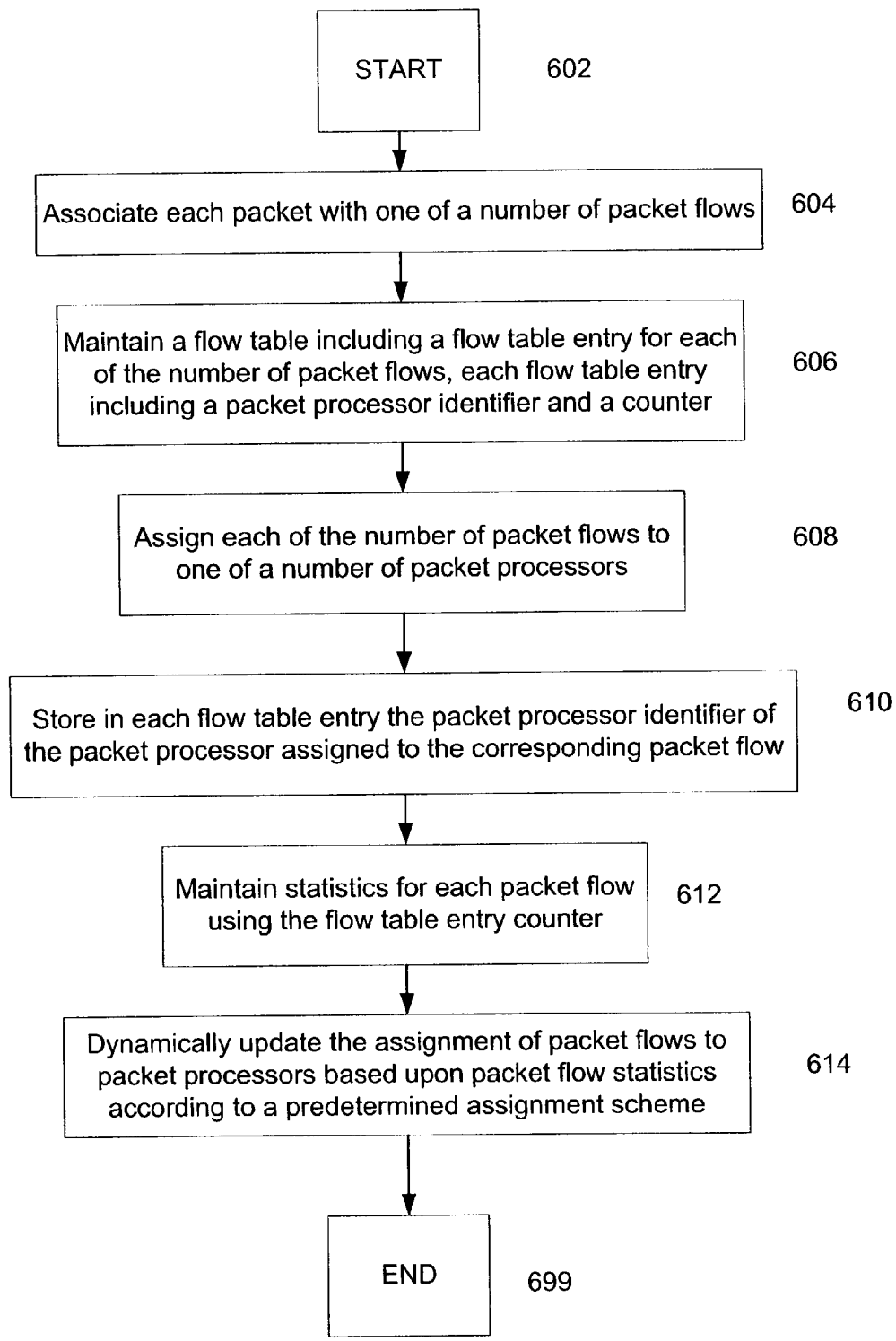
FIG. 6 is a logic flow diagram showing exemplary packet scheduling logic for assigning packet flows in accordance with an embodiment of the present invention.

FIG. 6 is a logic flow diagram showing exemplary packet scheduling logic 600 for assigning packet flows in accordance with an embodiment of the present invention. Beginning in block 602, the logic associates each packet with one of a number of packet flows, in block 604. The logic maintains a flow table including a flow table entry for each of the number of packet flows, in block 606. Each flow table entry includes a packet processor identifier and a counter. The logic assigns each of the number of packet flows to one of a number of packet processors, in block 608. The logic stores in each flow table entry the packet processor identifier of the packet processor assigned to the corresponding packet flow, in block 610. The logic maintains statistics for each packet flow using the flow table entry counter, in block 612. The logic dynamically updates the assignment of packet flows to packet processors based upon packet flow statistics according to a predetermined assignment scheme, in block 614. The logic 600 terminates in block 699.

Figure 7:
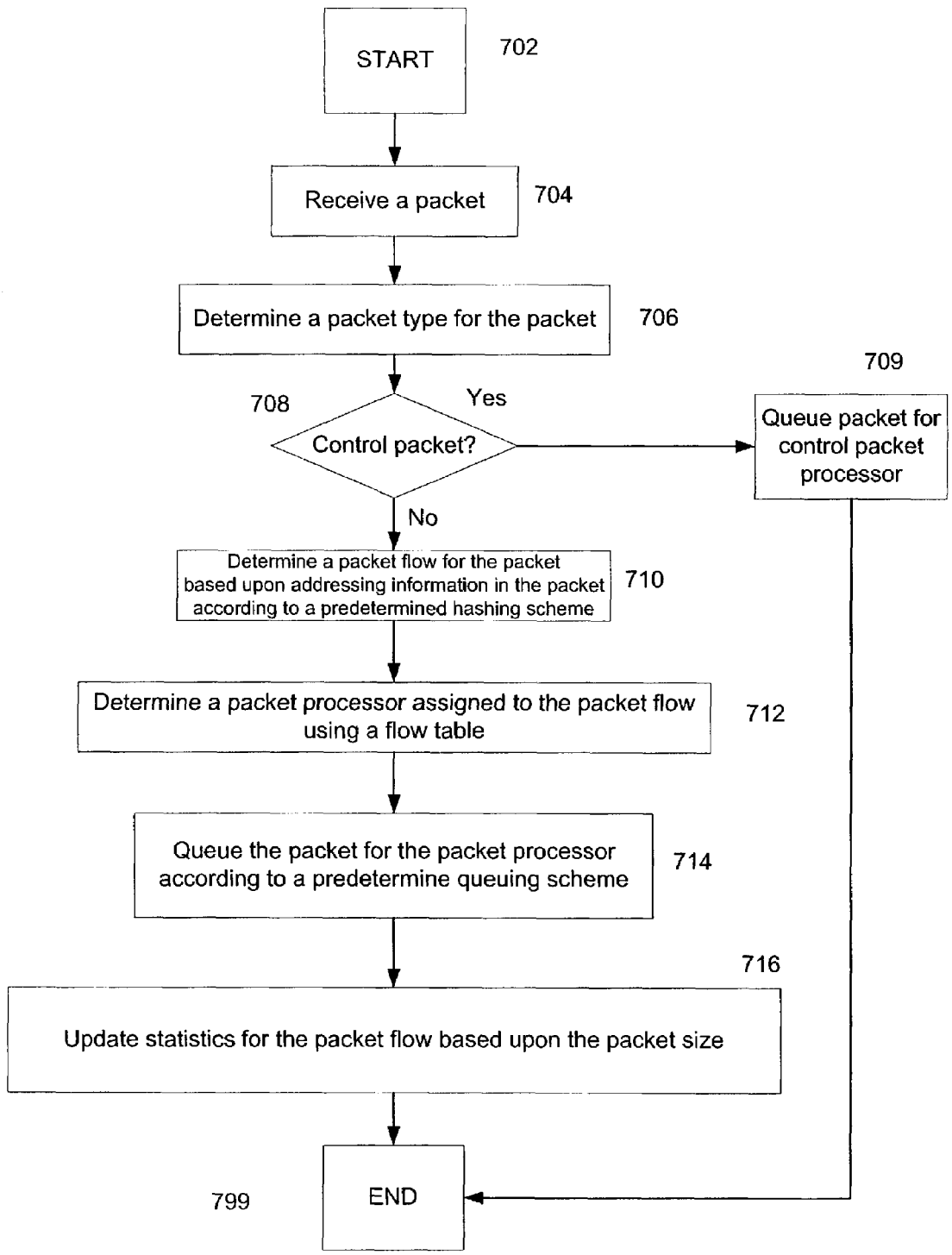
FIG. 7 is a logic flow diagram showing exemplary packet scheduling logic for scheduling a packet in accordance with an embodiment of the present invention.

FIG. 7 is a logic flow diagram showing exemplary packet scheduling logic 700 for scheduling a packet in accordance with an embodiment of the present invention. Beginning in block 702, and upon receiving a packet in block 704, the logic determines a packet type for the packet, in block 706. If the packet is a control packet (YES in block 708), then the logic queues the packet for the control packet processor, in block 709. If the packet is a non-control packet (NO in block 708), then the logic determines a packet flow for the packet based upon addressing information in the packet according to a predetermined hashing scheme, in block 710. The logic then determines a packet processor assigned to the packet flow using the flow table, in block 712. The logic queues the packet for the packet processor according to a predetermined queuing scheme, in block 714, and updates statistics for the packet flow based upon the packet size, in block 716. The logic 700 terminates in block 799.

Figure 8:
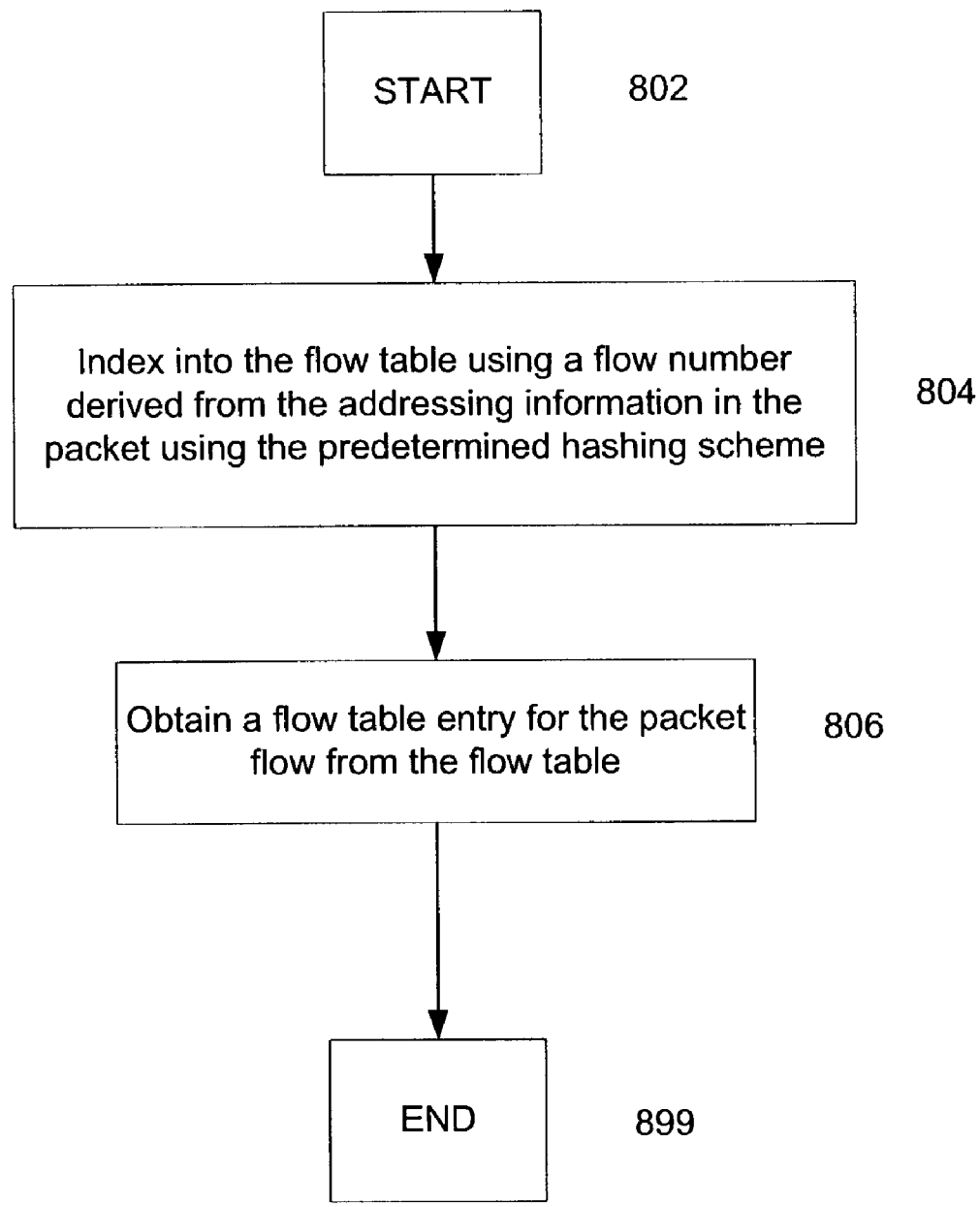
FIG. 8 is a logic flow diagram showing exemplary packet scheduling logic for determining a packet processor assigned to the packet flow in accordance with an embodiment of the present invention.

FIG. 8 is a logic flow diagram showing exemplary packet scheduling logic for determining a packet processor assigned to the packet flow in block 712 in accordance with an embodiment of the present invention. Beginning block 802, the logic indexes into the flow table using a flow number derived from the addressing information in the packet using the predetermined hashing scheme, in block 804. The logic then obtains a flow table entry for the packet flow from the flow table, in block 806. The logic then obtains a packet processor identifier for the packet flow from the flow table entry, in block 808. The logic terminates in block 899.

Figure 9:
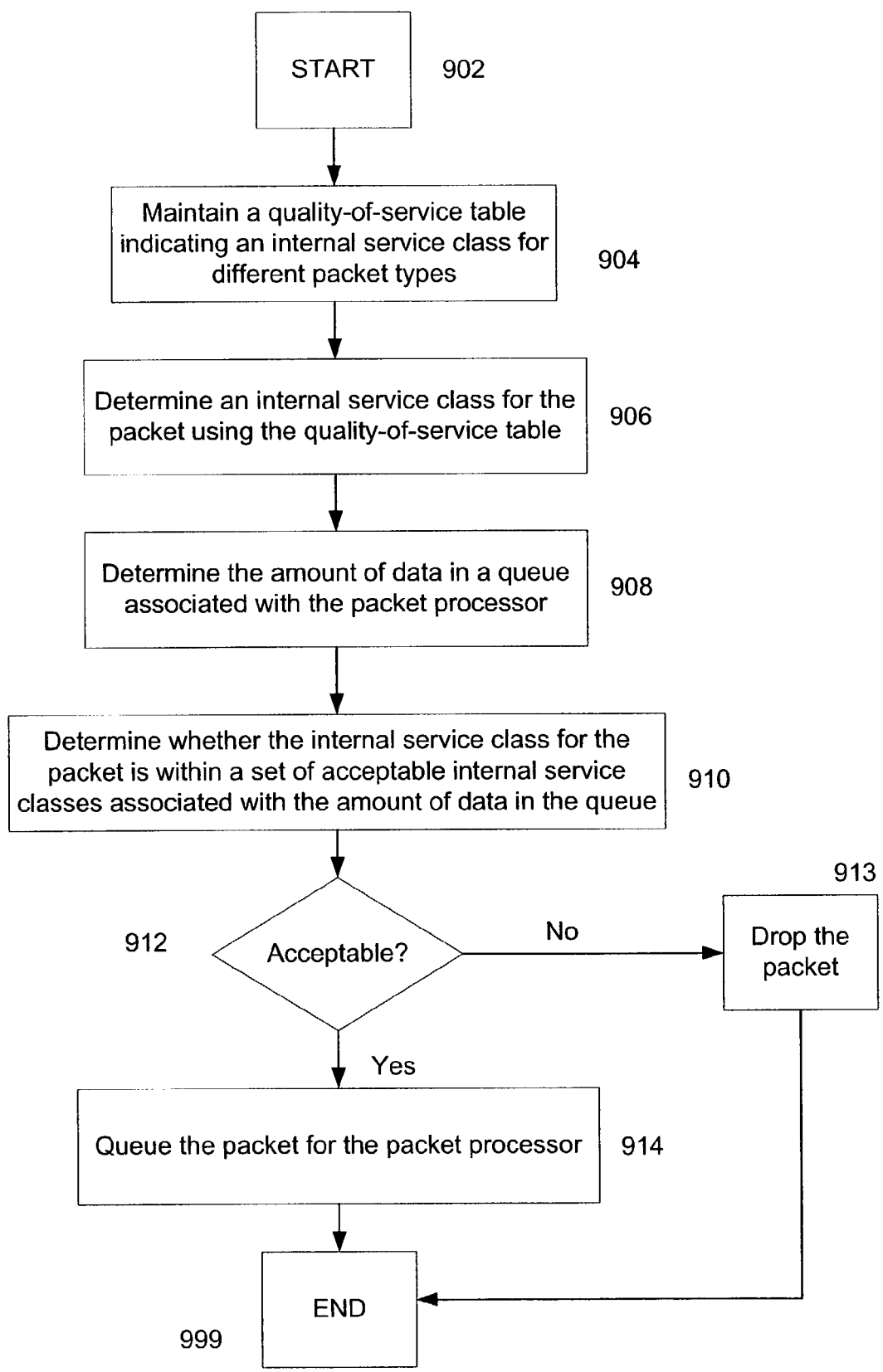
FIG. 9 is a logic flow diagram showing exemplary packet scheduling logic for queuing a packet in accordance with an embodiment of the present invention.

FIG. 9 is a logic flow diagram showing exemplary packet scheduling logic for queuing a packet in block 714 in accordance with an embodiment of the present invention. Beginning in block 902, the logic maintains a quality-of-service table indicating an internal service class for different packet types, in block 904. The logic determines an internal service class for the packet using the quality-of-service table, in block 906. The logic determines the amount of data in a queue associated with the packet processor, in block 908. The logic determines whether the internal service class for the packet is within a set of acceptable internal service classes associated with the amount of data in the queue, in block 910. If the internal service class for the packet is not within a set of acceptable internal service classes associated with the amount of data in the queue (NO in block 912, then the logic drops the packet, in block 913, without queuing the packet for the packet processor. If the internal service class for the packet is within a set of acceptable internal service classes associated with the amount of data in the queue (YES in block 912), then the logic queues the packet for the packet processor, in block 914. The logic terminates in block 999.

Figure 10:
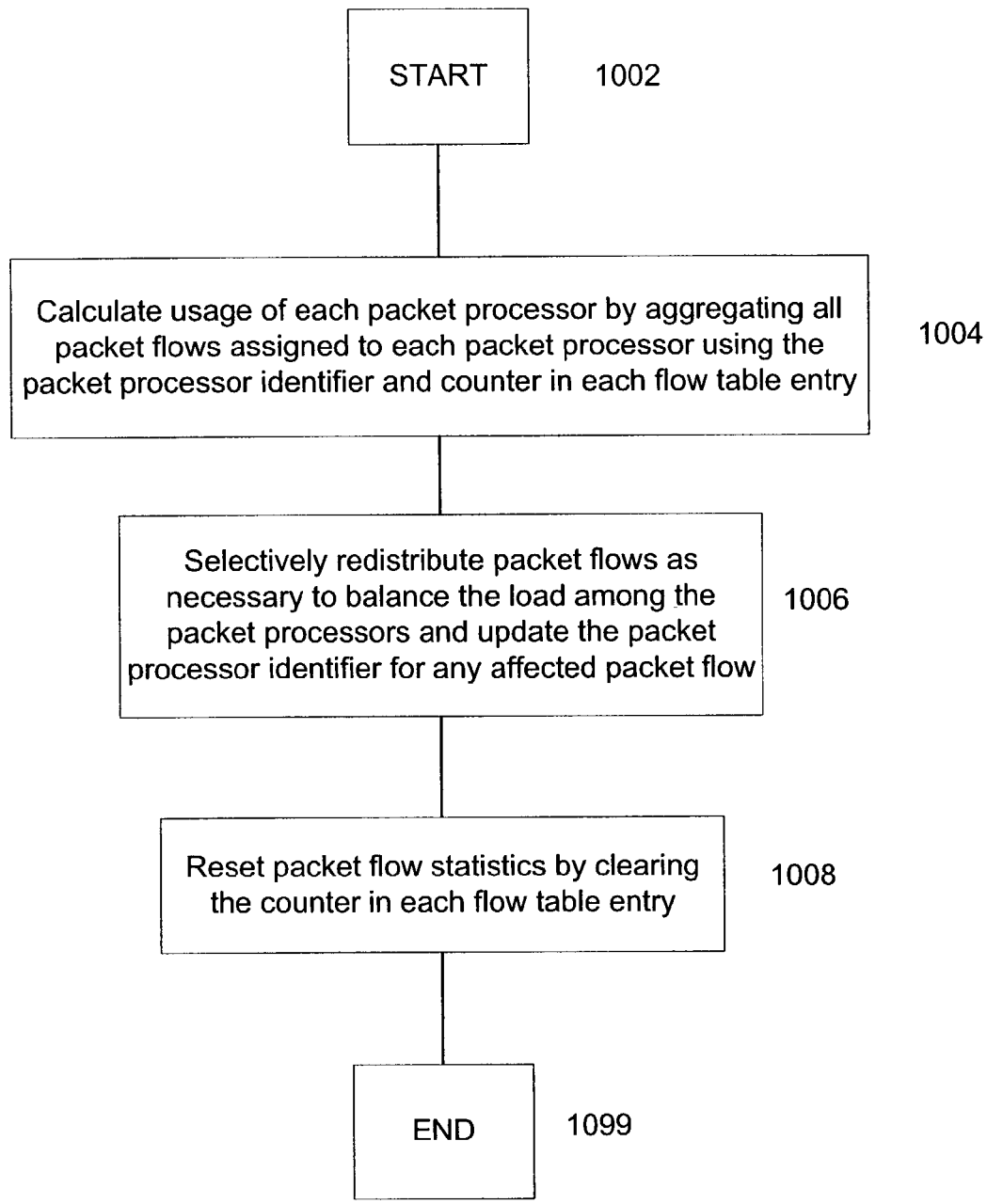
FIG. 10 is a logic flow diagram showing exemplary packet scheduling logic for updating the assignment of packet flows to packet processors in accordance with an embodiment of the present invention.

FIG. 10 is a logic flow diagram showing exemplary packet scheduling logic for updating the assignment of packet flows to packet processors in block 614 in accordance with an embodiment of the present invention. Beginning in block 1002, the logic calculates usage of each packet processor by aggregating all packet flows assigned to each packet processor using the packet processor identifier and counter in each flow table entry, in block 1004. The logic selective redistributes packet flows as necessary to balance the load among the packet processors and updates the packet processor identifier for any affected packet flow, in block 1006. The logic resets packet flow statistics by clearing the counter in each flow table entry, in block 1008. The logic terminates in block 1099.

In one particular embodiment of the present invention, the packet scheduling scheme of the present invention is used for scheduling packets in a 10 Gigabit Ethernet line card that is used, for example, within a switch or router. The line card includes eight packet processors. Each packet processor has a limit of 1 Gigabit/second input and x packets/second lookup (corresponding to 1.2 Gigabit/second for 64-byte packets). The packet scheduling logic receives packets over a 10 Gigabit Ethernet PHY/MAC interface and divides the packets among the eight packet processors substantially as described above. The outputs of the eight packet processors are fed into a fabric interface having two 4.8 Gigabit/second outputs into a fabric (four packet processors per fabric output).

Figure 11:
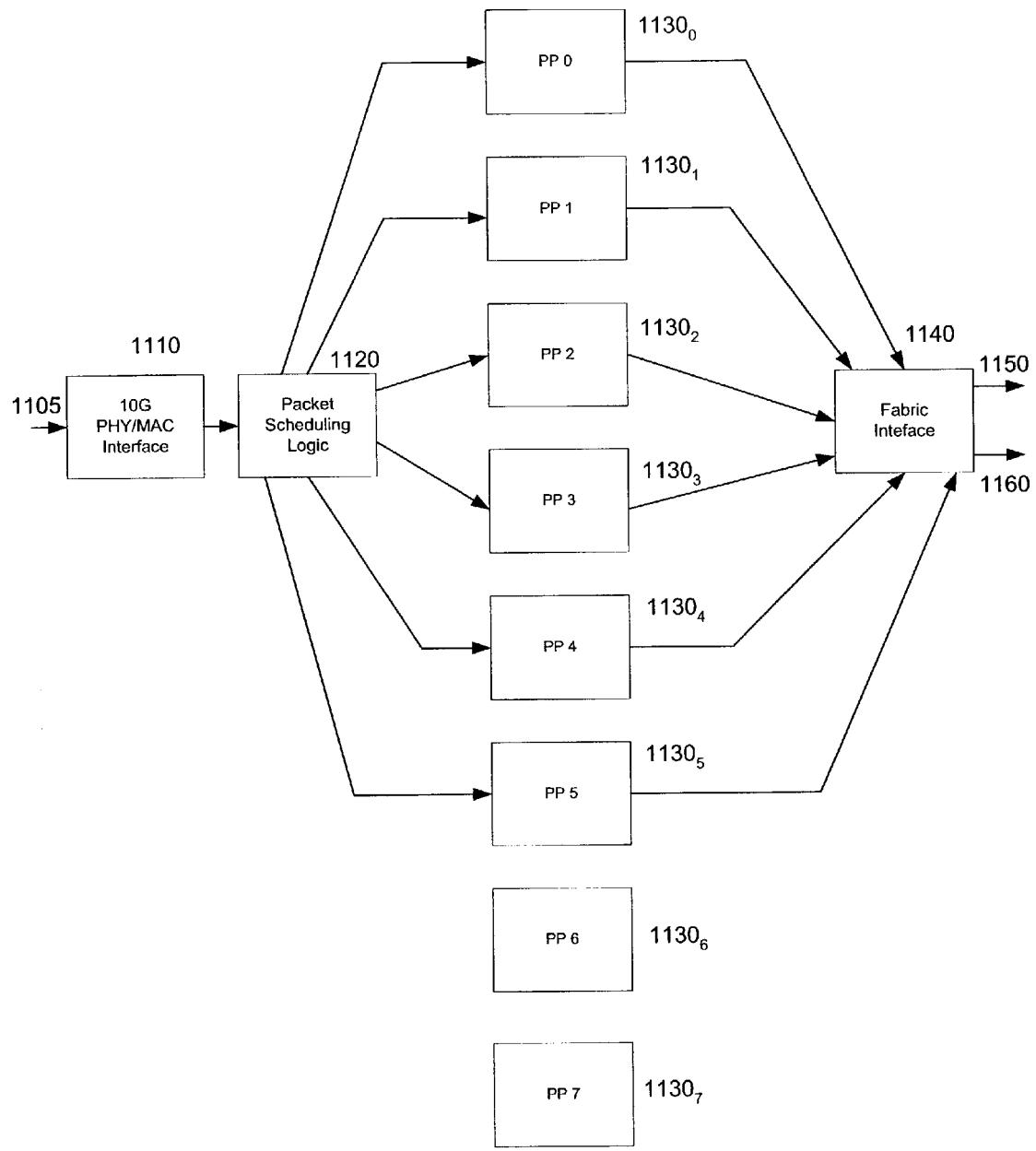
FIG. 11 is a block diagram showing the relevant components of an exemplary 10 Gigabit Ethernet line card in accordance with an embodiment of the present invention.

FIG. 11 is a block diagram showing the relevant components of an exemplary 10 Gigabit Ethernet line card 1100 in accordance with an embodiment of the present invention. Among other things, the line card 1100 includes a 10 Gigabit Ethernet PHY/MAC interface 1110, packet scheduling logic 1120, eight packet processors $1130_0$-$1130_7$, and fabric interface 1140. The 10 Gigabit Ethernet PHY/MAC interface 1110 is couplable to a 10 Gigabit Ethernet network 1105. The packet scheduling logic 1120 is operably coupled to receive packets over the Gigabit Ethernet PHY/MAC interface 1110 and to allocate the packets among the eight packet processors. The fabric interface 1140 is operably coupled to receive the outputs of the eight packet processors. The fabric interface 1140 includes two 4.8 Gigabit/second fabric outputs 1150 and 1160 and assigns four of the packet processors to each fabric output.

One of the eight packet processors (PP 0) is reserved for control packets, and the remaining seven packet processors are used for non-control packets. Thus, the packet scheduling logic 11120 assigns packets from a 10 Gigabit/second incoming stream to the seven packet processors. At maximum data rates, the system is clearly oversubscribed. However, even for an input rate below 7 Gigabits/second, it is possible for one or more of the seven packet processors to be oversubscribed if the packet scheduling logic does not balance the packet load among the seven packet processors. Thus, it is desirable to substantially balance the packet load among the seven packet processors. It is also desirable to maintain packet order within each logical flow (e.g., VLAN or MAC address).

In an exemplary embodiment of the present invention, the flow table and the QoS table are maintained by a control processor (CP) card that resides along with the line card in the router or switch. The number of packet flows is greater than the number of packet processors (for example, 256 or 640 packet flows). The CP card assigns each packet flow to a packet processor using the flow table and dynamically updates the assignment of packet flows to packet processors based upon statistics provided by the line card. The CP card also sets up the QoS table for use by the line card.

The packet scheduling logic 1120 on the line card uses the flow table and the QoS table for assigning each packet to its respective packet processor. Specifically, when a packet is received, the packet scheduling logic 1120 determines a packet type for the packet. If the packet is a control packet, then the packet scheduling logic 1120 queues the packet for the control packet processor. If the packet is a non-control packet, then the packet scheduling logic 1120 determines a packet flow for the packet based upon addressing information in the packet according to a predetermined hashing scheme. The packet scheduling logic 1120 determines a packet processor assigned to the packet flow using the flow table, specifically by indexing into the flow table using the flow number and obtaining the packet processor identifier from the flow table entry. The packet scheduling logic 1120 determines an ISC for the packet using the QoS table. The packet scheduling logic 1120 determines the amount of data in the queue associated with the packet processor and, if the ISC for the packet is within a set of acceptable internal service classes for the amount of data in the queue, the packet scheduling logic 1120 queues the packet for the packet processor. The packet scheduling logic 1120 updates the counter in the flow table entry based upon the packet size.

In an exemplary embodiment of the present invention, the line card includes two Field-Programmable Gate Arrays (FPGAs) that implement the packet scheduling logic 1120. For convenience, the two FPGAs are referred to respectively as the incoming FPGA (IFPGA) and the outgoing FPGA (OFPGA).

Figure 12:
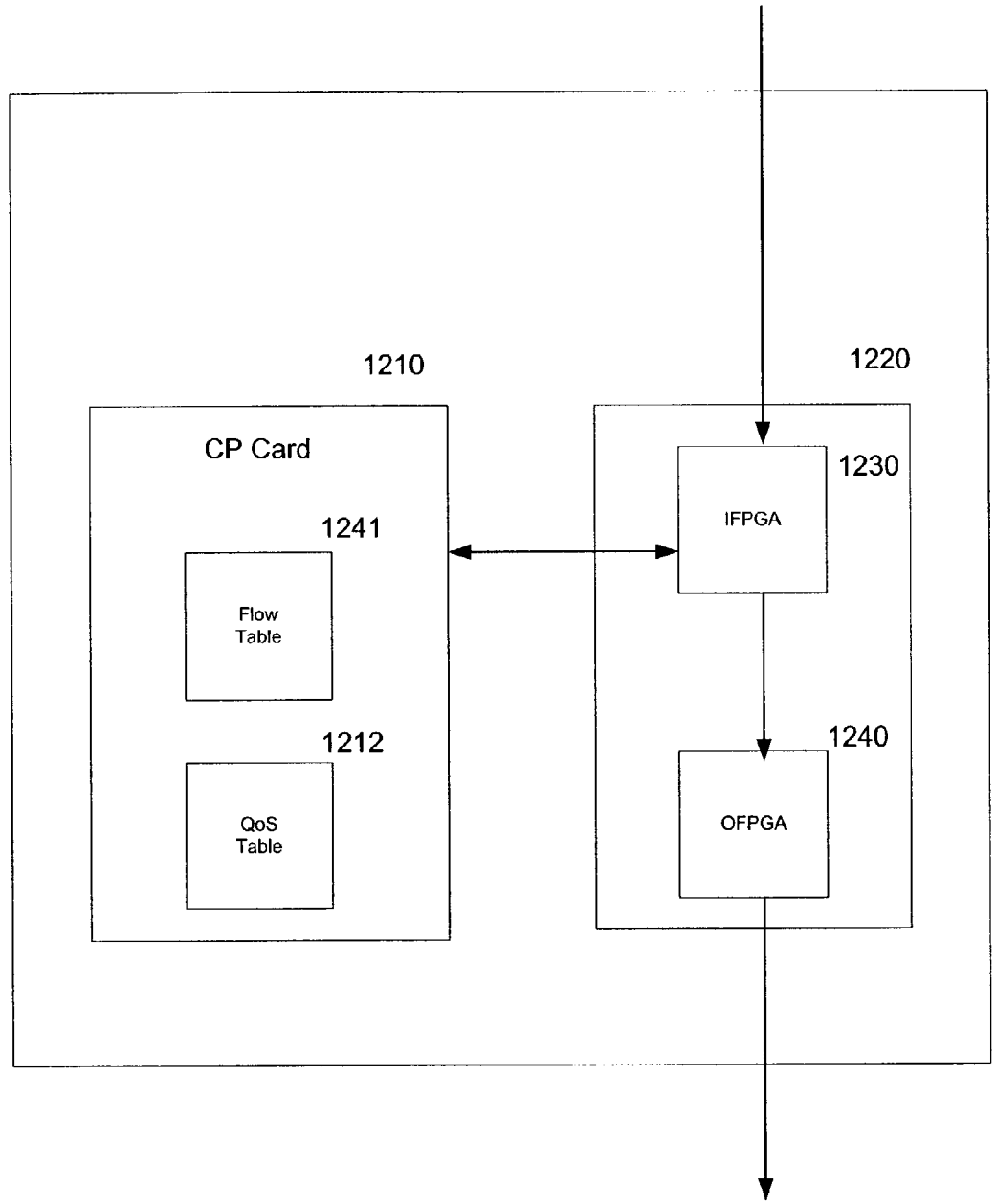
FIG. 12 is a block diagram showing an exemplary router or switch including a CP card and line card in accordance with an embodiment of the present invention.

FIG. 12 is a block diagram showing an exemplary router or switch 1200 including a CP card 1210 and line card 1220. The CP card 1210 maintains the flow table 1211 and the QoS table 1212. The line card 1220 includes IFPGA 1230 and OFPGA 1240.

The IFPGA 1230 includes the portions of the packet scheduling logic 1120 for assigning each packet to a packet processor, including using hashing function to determine the packet flow for the packet, using the flow table to determine the packet processor for the packet flow, using the QoS table to determine the ISC for the packet, sending packets to the OFPGA 1240 to be queued, and updating statistics for the packet flow.

The OFPGA 1240 includes the portions of the packet scheduling logic 1120 for queue management, including determining the amount of data in the packet processor queue and deciding whether to drop or queue the packet based upon the ISC of the packet and the amount of data in the queue.

It should be noted that the present invention is in no way limited to any of the particular implementational details described above. For example, the present invention is not limited to the use of an explicit flow table or flow table entry format for maintaining the assignment of packet flows to packet processors. The present invention is not limited to the use of a quality-of-service table or QoS table entry format for determining packet priority. The present invention is not limited to the use of a hashing function or to any particular hashing function for determining a packet flow for a packet. The present invention is not limited to any particular prioritized queuing scheme. The present invention is not limited to any particular scheme for determining the assignment of packet flows to packet processors. The present invention is not limited to implementation on one or more FPGAs. These and other details can be implemented in a variety of ways while remaining within the scope of the present invention.

It should be noted that the terms such as "switch" and "router" are used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Thus, the present invention may be embodied as a method for scheduling information processing using load balancing. The method involves associating each of a number of information units with one of a number of flows; assigning each of the number of flows to one of a number of processors, wherein the number of flows is greater than the number of processors, and wherein the assignment of each of the number of flows to one of the number of processors substantially balances the information processing load among the number of processors; and allocating each information unit to a processor based upon the flow associated with the information unit and the processor associated with the flow. Assigning each of the number of flows to one of a number of processors involves maintaining a flow table having a flow table entry for each flow and storing in each flow table entry a processor identifier for the corresponding flow. Allocating each information unit to a processor based upon the flow associated with the information unit and the processor associated with the flow involves receiving an information unit, determining the flow associated with the information unit, determining the processor associated with the flow, and allocating the information unit to the processor associated with the flow. Determining the flow associated with the information unit involves determining a flow for the information unit based upon the contents of the information unit using a predetermined scheme. The contents of the information unit comprise addressing information, and the predetermined scheme comprises a hashing function. Determining the processor associated with the flow involves indexing into a flow table using a flow number of the flow, obtaining a flow table entry from the flow table, and obtaining a processor identifier from the flow table entry. Allocating the information unit to the processor associated with the flow involves determining a priority for the information unit, determining an amount of data in a queue associated with the processor, queuing the information unit for the processor, if the priority for the information unit is within a set of acceptable priorities for the amount of data in the queue, and dropping the information unit without queuing the information unit for the processor, if the priority for the information unit is not within a set of acceptable priorities for the amount of data in the queue. Determining a priority for the information unit involves determining the priority for the information unit based upon the contents of the information unit and a quality-of-service table. The method may also involve updating statistics for the flow based upon an information unit size and dynamically updating the assignment of flows to processors based upon updated statistics for the flows.

The present invention may also be embodied as an apparatus having an interface over which information units are received, a number of processors for processing information units, and scheduling logic for allocating each information unit to a processor, wherein the scheduling logic is operably coupled to receive an information unit over the interface, determine a flow associated with the information unit, determine a processor associated with the flow, and allocate the information unit to the processor associated with the flow. The scheduling logic is operably coupled to determine the flow associated with the information based upon the contents of the information unit according to a predetermined scheme. The contents of the information unit comprise addressing information, and the predetermined scheme comprises a hashing function. The scheduling logic is operably coupled to index into a flow table using a flow number of the flow, obtain a flow table entry from the flow table, and obtain a processor identifier from the flow table entry. The scheduling logic is operably coupled to determine a priority for the information unit, determine an amount of data in a queue associated with the processor, queue the information unit for the processor, if the priority for the information unit is within a set of acceptable priorities for the amount of data in the queue, and drop the information unit without queuing the information unit for the processor, if the priority for the information unit is not within a set of acceptable priorities for the amount of data in the queue. The scheduling logic is operably coupled to determine a priority for the information unit based upon the contents of the information unit and a quality-of-service table. The scheduling logic is operably coupled to update statistics for the flow based upon an information unit size.

The present invention may also be embodied as a system for scheduling. The system includes means for associating each of a number of information units with one of a number of flows; means for assigning each of the number of flows to one of a number of processors, wherein the number of flows is greater than the number of processors, and wherein the assignment of each of the number of flows to one of the number of processors substantially balances the information processing load among the number of processors; and means for allocating each information unit to a processor based upon the flow associated with the information unit and the processor associated with the flow. The means for assigning each of the number of flows to one of a number of processors comprises means for maintaining a flow table having a flow table entry for each flow and means for storing in each flow table entry a processor identifier for the corresponding flow. The means for allocating each information unit to a processor based upon the flow associated with the information unit and the processor associated with the flow comprises means for receiving an information unit, means for determining the flow associated with the information unit, means for determining the processor associated with the flow, and means for allocating the information unit to the processor associated with the flow. The system may also include means for updating statistics for the flow based upon an information unit size and means for dynamically updating the assignment of flows to processors based upon updated statistics for the flows.

The present invention may be embodied in other specific forms without departing from the true scope of the invention. The described embodiments are to be considered in all respects only as illustrative and not restrictive.

What is claimed is:

1. A method for scheduling information processing using load balancing, the method comprising:
   associating each of a number of information units with one of a number of flows;
   assigning each of the number of flows to one of a number of processors, wherein the number of flows is greater than the number of processors, and wherein the assignment of each of the number of flows to one of the number of processors substantially balances the information processing load among the number of processors; and
   dynamically allocating each information unit to, including indexing into a flow table using a flow number of the flow to obtain a flow table entry, obtaining a processor identifier from the flow table entry and allocating the information unit to the processor associated with the process identifier, wherein processor identifiers stored in the flow table based upon the an amount of data associated with each of the number of flows and each of the number of processors.

2. The method of claim 1, wherein assigning each of the number of flows to one of a number of processors comprises:
   maintaining the flow table, the flow table having a flow table entry for each flow; and
   storing in each flow table entry a processor identifier for the corresponding flow.

3. The method of claim 1, wherein dynamically allocating each information unit to a processor comprises:
   receiving an information unit;
   determining the flow associated with the information unit; and
   determining the processor associated with the flow responsive to the flow table entry.

4. The method of claim 3, wherein determining the flow associated with the information unit comprises:
   determining a flow for the information unit based upon the contents of the information unit using a predetermined scheme.

5. The method of claim 4, wherein the contents of the information unit comprise addressing information.

6. The method of claim 4, wherein the predetermined scheme comprises a hashing function.

7. The method of claim 3, further comprising:
   updating statistics for the flow based upon an information unit size.

8. The method of claim 7, further comprising:
   dynamically updating the assignment of flows to processors based upon updated statistics for the flows.

9. A method for scheduling information processing using load balancing, the method comprising:
   associating each of a number of information units with one of a number of flows;
   assigning each of the number of flows to one of a number of processors, wherein the number of flows is greater than the number of processors, and wherein the assignment of each of the number of flows to one of the number of processors substantially balances the information processing load among the number of processors; and
   allocating each information unit to a processor based upon the flow associated with the information unit and the processor associated with the flow by determining a flow associated with each information unit, determining the processor associated with the flow; indexing into a flow table using a flow number of the flow to obtain a flow table entry, obtaining a processor identifier from the flow table entry and allocating the information unit to the processor associated with the process identifier.

10. A method for scheduling information processing using load balancing, the method comprising:
- associating each of a number of information units with one of a number of flows;
- assigning each of the number of flows to one of a number of processors, wherein the number of flows is greater than the number of processors, and wherein the assignment of each of the number of flows to one of the number of processors substantially balances the information processing load among the number of processors; and
- allocating each information unit to a processor associated with the flow by
- determining a priority for the information unit;
- determining an amount of data in a queue associated with the processor;
- queuing the information unit for the processor, if the priority for the information unit is within a set of acceptable priorities for the amount of data in the queue; and
- dropping the information unit without queuing the information unit for the processor, if the priority for the information unit is not within a set of acceptable priorities for the amount of data in the queue.

11. The method of claim 10, wherein determining a priority for the information unit comprises:
- determining the priority for the information unit based upon the contents of the information unit and a quality-of-service table.

12. An apparatus comprising:
- an interface over which information units are received;
- a number of processors for processing information units; and
- scheduling logic for dynamically allocating each information unit to a processor, wherein the scheduling logic is operably coupled to receive an information unit over the interface, determine a flow associated with the information unit by indexing into a flow table using a flow number of the flow to obtain a flow table entry comprising a processor identifier, determine a processor associated with the flow using the processor identifier from the flow table entry, and allocate the information unit to the processor identified by the processor identifier, wherein the processor identifiers are stored in the flow table entry responsive to an amount of data associated with each of the plurality of flows and at the plurality of processors.

13. The apparatus of claim 12, wherein the scheduling logic is operably coupled to determine the flow associated with the information based upon the contents of the information unit according to a predetermined scheme.

14. The apparatus of claim 13, wherein the contents of the information unit comprise addressing information.

15. The apparatus of claim 13, wherein the predetermined scheme comprises a hashing function.

16. The apparatus of claim 12, wherein the scheduling logic is operably coupled to update statistics for the flow based upon an information unit size.

17. An apparatus comprising:
- an interface over which information units are received;
- a number of processors for processing information units; and
- scheduling logic for allocating each information unit to a processor, wherein the scheduling logic is operably coupled to receive an information unit over the interface, determine a flow associated with the information unit, determine a processor associated with the flow, and allocate the information unit to the processor associated with the flow;
- wherein the scheduling logic is operably coupled to determine a priority for the information unit, determine an amount of data in a queue associated with the processor, queue the information unit for the processor, if the priority for the information unit is within a set of acceptable priorities for the amount of data in the queue, and drop the information unit without queuing the information unit for the processor, if the priority for the information unit is not within a set of acceptable priorities for the amount of data in the queue.

18. The apparatus of claim 17, wherein the scheduling logic is operably coupled to determine a priority for the information unit based upon the contents of the information unit and a quality-of-service table.

19. A system for scheduling comprising:
- means for associating each of a number of information units with one of a number of flows;
- means for dynamically assigning each of the number of flows to one of a number of processors, wherein the number of flows is greater than the number of processors, and wherein the assignment of each of the number of flows to one of the number of processors substantially balances the information processing load among the number of processors by periodically assigning flows to processors responsive to an amount of data associated with each of the number of flows and at each of the number of processors, wherein the processors are assigned to flows using a flow table comprising a plurality of flow table entries, each flow table entry comprising a processor identifier, the flow table being indexed by a flow number associated with a received information unit to provide a flow table entry comprising a processor identifier identifying a processor associated with the flow; and
- means for allocating each information unit to a processor based upon the flow associated with the information unit and the processor associated with the flow.

20. The system of claim 19, further comprising:
- means for updating statistics for the flow based upon an information unit size.

21. The system of claim 20, further comprising:
- means for dynamically updating the assignment of flows to processors based upon updated statistics for the flows.

* * * * *